M. J. SANDIN

Oct. 21, 1930. CUT-OUT Re. 17,840

Original Filed April 1, 1922

WITNESSES:

H. B. Funk.

J. H. Wendig.

INVENTOR

Maurits J. Sandin

BY

Wesley G. Carr

ATTORNEY

Reissued Oct. 21, 1930 Re. 17,840

UNITED STATES PATENT OFFICE

MAURITS J. SANDIN, OF WILKINS TOWNSHIP, ALLEGHENY COUNTY, PENNSYLVANIA, ASSIGNOR TO WESTINGHOUSE ELECTRIC & MANUFACTURING COMPANY, A CORPORATION OF PENNSYLVANIA

CUT-OUT

Original No. 1,630,358, dated May 31, 1927, Serial No. 548,659, filed April 1, 1922. Application for reissue filed January 15, 1929. Serial No. 332,755.

My invention relates to cut-out mechanism and particularly to thermal-responsive circuit-interrupting mechanism for protecting electric apparatus from excessive current.

One object of my invention is to provide a cut-out mechanism that may be reset repeatedly and that may be installed in a casing or receptacle similar in shape and dimensions to a standard cartridge fuse of equal capacity and which may be mounted in standard fuse clips or jaws and substituted for standard fuses.

Another object of my invention is to provide a cut-out device, having the above characteristics, that will open the circuit under predetermined overload conditions and within a predetermined time and wherein means are provided for so regulating the thermal-responsive element thereof that it will respond to different predetermined current conditions.

Another object of my invention is to provide a thermal cut-out that may be manually closed or reset, or manually released or opened, and which is responsive to predetermined current conditions.

Another object of my invention is to provide a cut-out device wherein a barrier is interposed between one of the contact members of the conductors and the actuating mechanism therefor for preventing damage to the latter when the circuit is interrupted.

Another object of my invention is to provide a cut-out mechanism that is simple and inexpensive to manufacture.

These and other objects, that will be made apparent throughout the further description of my invention, are attained by means of the apparatus hereinafter described, and illustrated in the accompanying drawings, wherein.

Figure 1:
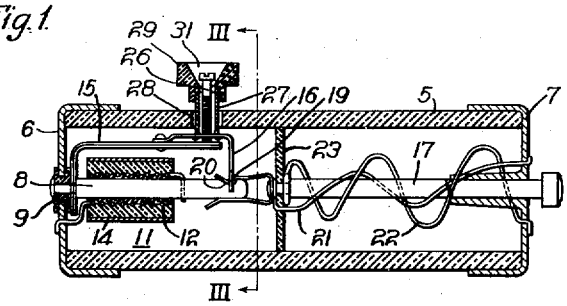
Figure 1 is a longitudinal section through a cut-out or switch mechanism embodying features of my invention.

Referring to the drawings, the cut-out mechanism includes a tubular insulating casing 5 having end ferrules 6 and 7 substantially closing the end of the tube or casing. The insulating tube and the ferrules are similar in shape and dimensions to those of cartridge fuses having an equal capacity and, therefore, the casing is adapted to be inserted in standard fuse clips and jaws, it being the purpose of the device, in some cases, to take the place of standard fuses, the advantage of the device over the standard fuse being that, after the circuit is interrupted, due to either overload or short-circuit conditions in the circuit, it may be repeatedly reset without requiring replacement of any parts thereof.

A conducting rod or contact member 8 is attached to the ferrule 6 and is insulated therefrom by means of insulating washers 9. A heating element 11, comprising a heating coil 12, surrounds the contact member 8 and is supported thereby. The heating element, comprising a heating coil, preferably made of a high-resistance metal, is embedded in a tubular sheath of heat-absorbing insulating-material that is enclosed within the metal sleeve 14. One end of the coil 12 is conductively attached to the ferrule 6 and the other end is conductively connected to the rod 8, as indicated in Fig. 1.

A bimetallic thermal-responsive element 15 is mounted upon the conductor 8 and comprises two metal strips that are welded together and have different coefficients of expansion. Increases of the temperature of the bimetallic element cause the free end thereof to be moved toward the walls of the casing 5. The element is placed in close proximity to the heating element 11 and, when heated, serves to move a latch member 16 away from the contact member 8.

An insulating rod 17 is slidably mounted in the ferrule 7 for longitudinal movement and carries, at its inner end, a resilient conductor 18 having an offset portion 19 that is adapted to automatically slip into a notch 20 in the conductor 8 to make good conductive contact with the member when the rod 17 is moved to its innermost position, as indicated in Fig. 1.

The contact member 18 is conductively connected to the ferrules 7 by means of a flexible conductor 21 that is attached, at one end, to the contact member 18 and, at the other end, to the ferrule 7. The contact member 18 is normally yieldingly retained in spaced relation to the conductor 8, or in open position, by means of a helical spring 22 that is secured, at one end, to the inner end of the rod 17 and, at the other end, to the ferrule 7. The inner end of the rod 17 is provided with a barrier member 23 that is slidable longitudinally within the casing. The barrier serves to protect the flexible conductor and the spring 22 from the arc produced when the contact members 8 and 18 are separated.

The latch member 16 is provided with a yoke member 24 that straddles the conductor 8 and the offset portion 19 of the contact member 18. The yoke 24 is provided with inwardly-turned projections 25 that engage the inner face of the offset portion 19 of the contact member 18 in such manner that, when the latch 16 is moved toward the walls of the casing 5, the offset portion 19 of the contact member 18 is withdrawn from engagement with the notch 20 and the circuit broken by reason of the separation of the contact members. The spring 22 is of such construction that it causes the contact member 18 to be withdrawn from the contact member 8 with a snap-action.

In order that the thermal-responsive element 15 may be adjusted to release the contact member 18 under different predetermined current conditions, it is provided with an adjusting screw 26 having threaded engagement with the latch member 16. The end of the screw 26 engages the free end of the bimetallic member 15 and, by turning the screw 26, the position of the latch member 16 relative to the end of the bimetallic element may be varied. By reason of this adjustment, the cut-out mechanism may be made to operate at different time intervals with a given current or at equal time intervals with different currents.

In order to provide convenient means for actuating the latch member 16 manually, the latch 16 is provided with a tube 27 that surrounds the shank of the screw 26 and extends through an opening 28 in the casing 5. The outer end of the tube is provided with an insulating handle 29 which may be gripped for manually operating and tripping the latch 16 to cause the circuit to be interrupted. The handle 29 is provided with a central opening 31 which permits of movement of the screw 26 therein. The head of the screw 26, however, lies beneath the outer face of the handle 29 and, consequently, cannot be operated or adjusted, or accidentally turned, except by means of a proper tool, such as a screw driver.

Figure 2:
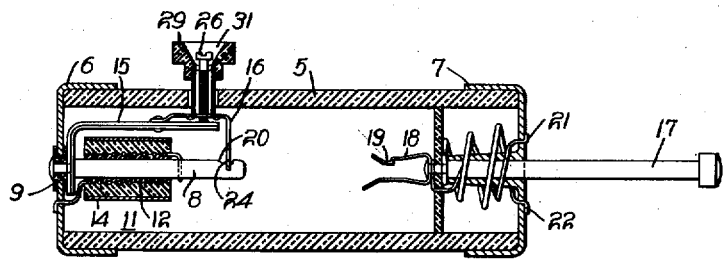
Fig. 2 is a view similar to Fig. 1, showing certain elements in inoperative position.
Figure 3:
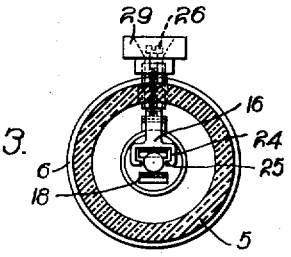
Fig. 3 is a transverse sectional view taken on the line III—III of Fig. 1.

The operation of the cut-out is as follows: the casing is placed within the fuse-jaw members of the circuit in a manner usual to fuses of the cartridge type, with the handle 29 extending outwardly in an accessible position. The screw 26 is adjusted to release the latch 16 under desired current conditions. When an overload occurs in the circuit for a predetermined length of time, the heating element 11 transmits heat to the bimetallic element which causes outward movement of the free end thereof, thus causing the offset portion 19 of the contact member 18 to be withdrawn from the notch 20. When the contact member 18 has been released, the spring 22 causes it to be withdrawn to the open position indicated in Fig. 2 with a snap action. When it is desired to open the circuit manually, the handle or knob 29 is pulled outwardly and the contact member 18 is released by the latch member 16.

Figure 4:
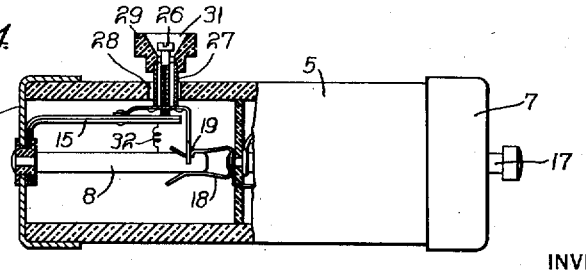
Fig. 4 is a fragmentary longitudinal sectional view of a modified form of cut-out construction.

Referring to Fig. 4, wherein a modified form of construction is illustrated, it will be seen that the bimetallic element serves as a heating element, thereby eliminating the necessity for an auxiliary heater, such as is illustrated in Fig. 1. The construction of the casing, end ferrules and manual-releasing mechanism is identical to that of the device above described. In the modified form, however, the bimetallic element 15 is directly connected to the end ferrule 6, and the conductor or contact member 8 is insulated from the ferrule. The free end of the bimetallic strip 15 is connected to the contact member 8 by means of a flexible conductor 32. In this construction, excess current, passing through the bimetallic element 15, causes it to be heated. This action causes the free end of the element 15 to move outwardly and to release the offset portion 19 of the contact member 18 from engagement with the contact member 8 and the circuit to be broken by the opening movement of the contact member 18.

Figure 5:
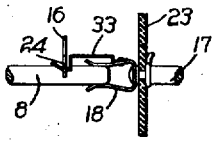
Fig. 5 is a view of a portion of a modified form of latch mechanism.

A more sensitive latching device is illustrated in Fig. 5, wherein the contact member 18 is provided with a relatively light spring 33 that engages the notch 20 and retains the contact member in engagement with the conductor 8. A device of this character releases the contact members at relatively low current values.

It will be apparent from the foregoing that the construction provides a simple and effective cut-out device that may be used where cartridge fuses have heretofore been employed. While the device is capable of interrupting short-circuits, it may be advisable to place a fuse of greater capacity than the cut-out device in series for the purpose of preventing injury to the cut-out mechanism under severe short-circuit conditions.

While I have shown a device as applied to a cartridge fuse of the ferrule type, it is obvious the the device may be designed for use in fuse clips adapted to receive blades of cartridge fuses having blade terminals.

The device is particularly well adapted for use in motor circuits wherein it is desirable to provide overload protection. The thermal-responsive elements may be so proportioned that they are not actuated by normal starting currents but will cause the circuit to be opened when an overload has prevailed a predetermined time.

While I have described and illustrated but two embodiments of my invention, it will be apparent to those skilled in the art that variout changes, modifications, additions, substitutions and omissions may be made in the apparatus illustrated without departing departing from the spirit and scope of my invention as set forth in the appended claims.

I claim as my invention:

1. A cut-out device comprising a tubular insulating casing, terminal members mounted on the ends of the casing, relatively movable contact members connected to the terminal members and adapted to conductively connect the terminal members, latching means for securing the contact members in engagement, means for separating the contact members in a direction longitudinally of the casing upon their release by the latching means, and a barrier on one of the members extending transversely of the casing.

2. A cut-out device comprising an insulating casing, terminal members mounted on the ends of the casing, relatively movable contact members connected to the terminal members and adapted to conductively connect the terminal members, means for separating the contact members in a direction longitudinally of the casing, and a barrier on one of the members extending transversely of the casing.

3. A thermal electric cut-out comprising an enclosing base, a pair of terminals secured to said base, a support of heat-conducting material mounted within said base, a movable bimetallic thermal-responsive element having one end secured to said support and electrically connected to one of said terminals to be heated in accordance with the current in the circuit controlled by the cut-out, a spring contact secured to said base and electrically connected to the other of said terminals, said contact being arranged to be flexed, to complete a circuit between said terminals, into a latching engagement in which it is mechanically interlocked with the free end of said element, and an electrical heater connected in said circuit for heating said support to supply heat to said thermal-responsive element and thereby cause the free end of said thermal element to move and thereby release said latching engagement.

4. A thermal electric cut-out comprising an enclosing base, a pair of terminals secured to said base, a support of heat-conducting material mounted within said base, a movable bimetallic thermal-responsive element having one end secured to said support and electrically connected to one of said terminals to be heated in accordance with the current in the circuit controlled by the cut-out, a spring contact secured to said base and electrically connected to the other of said terminals, said contact being arranged to be flexed into unlatching relation with the free end of said element to complete a circuit between said terminals, and an electrical heater connected in said circuit for heating said support to supply heat to said thermal-responsive element and thereby cause the free end of said thermal element to move and thereby release said spring contact member.

5. A thermal electric cut-out comprising an enclosing base, a pair of terminals secured to said base, a heater connected in a circuit between said terminals and mounted within said base, a thermal-responsive aggregate comprising a bimetallic member in heat-absorbing relation to said heater, a biased contact arranged so that when latched it completes a circuit between said terminals, and means for causing movement of said bimetallic member to release said latch.

6. A thermal electric cut-out comprising an enclosing base, a pair of terminals secured to said base, a heater connected in a circuit which is closed between said terminals at all times when current flows through said cut-out and mounted within said base, a thermal-responsive aggregate comprising a bimetallic member in heat-absorbing relation to said heater, a spring contact arranged to be fixed into a latching engagement to complete a circuit between said terminals and means for causing movement of said bimetallic member to release said latching engagement.

7. A thermal electric cut-out comprising an enclosing base, a pair of terminals secured to said base, a support of heat-conducting material mounted within said base, a movable bi-metallic thermal-responsive element having one end secured to said support and electrically connected to one of said terminals to be heated in accordance with the current in the circuit controlled by the cut-out, a spring contact secured to said base and electrically connected to the other of said terminals, said contact being arranged to be flexed into a latching engagement, controlled by the free end of said element, to complete a circuit between said terminals, and an electrical heater connected in said circuit for heating said support to supply heat to said thermal-responsive element and thereby cause the free end of said thermal element to move and thereby release said spring contact member.

8. A thermal electric cut-out comprising an enclosing base, a pair of terminals secured to said base, a support of heat-conducting material mounted within said base, a movable bimetallic thermal-responsive element having one end secured to said support and electrically connected to one of said terminals to be heated in accordance with the current in the circuit controlled by the cut-out, a spring contact secured to said base and electrically connected to the other of said terminals, said contact being arranged to be flexed into a latching engagement to complete a circuit between said terminals, said engagement being released by the free end of said element, and an electrical heater connected in said circuit for heating said support to supply heat to said thermal-responsive element and thereby cause the free end of said thermal element to move and thereby release said spring contact member.

In testimony whereof, I have hereunto subscribed my name this 10th day of January, 1929.

MAURITS J. SANDIN.